(12) United States Patent
Kilroy

(10) Patent No.: US 7,313,820 B2
(45) Date of Patent: Dec. 25, 2007

(54) METHOD AND SYSTEM FOR PROVIDING AN AUTHORIZATION FRAMEWORK FOR APPLICATIONS

(75) Inventor: John F. Kilroy, Portsmouth, NH (US)

(73) Assignee: International Business Machines Corporation, Armonk, NY (US)

( * ) Notice: Subject to any disclaimer, the term of this patent is extended or adjusted under 35 U.S.C. 154(b) by 501 days.

(21) Appl. No.: 10/748,126

(22) Filed: Dec. 29, 2003

(65) Prior Publication Data

US 2005/0149719 A1 Jul. 7, 2005

(51) Int. Cl.
- G06F 12/00 (2006.01)
- G06F 9/44 (2006.01)
- H04L 9/32 (2006.01)
- H04L 9/00 (2006.01)

(52) U.S. Cl. .................. 726/21; 713/189; 713/152; 719/320

(58) Field of Classification Search ............ 726/21; 719/320
See application file for complete search history.

(56) References Cited

U.S. PATENT DOCUMENTS

| | | | | |
|---|---|---|---|---|
| 5,966,702 A | * | 10/1999 | Fresko et al. ............. | 707/1 |
| 6,047,377 A | * | 4/2000 | Gong ...................... | 726/21 |
| 6,081,665 A | * | 6/2000 | Nilsen et al. ............. | 717/116 |
| 6,282,702 B1 | * | 8/2001 | Ungar ...................... | 717/148 |
| 6,560,774 B1 | * | 5/2003 | Gordon et al. ............. | 717/146 |
| 6,763,370 B1 | * | 7/2004 | Schmeidler et al. ......... | 709/203 |
| 6,851,108 B1 | * | 2/2005 | Syme et al. ............... | 717/146 |
| 6,865,735 B1 | * | 3/2005 | Sirer et al. ............... | 717/158 |
| 7,020,771 B2 | * | 3/2006 | Oran ...................... | 713/153 |
| 2002/0138441 A1 | * | 9/2002 | Lopatic .................... | 705/59 |
| 2002/0188869 A1 | * | 12/2002 | Patrick .................... | 713/201 |
| 2003/0018909 A1 | * | 1/2003 | Cuomo et al. .............. | 713/200 |
| 2005/0114848 A1 | * | 5/2005 | Choi et al. ................ | 717/148 |

OTHER PUBLICATIONS

Koved, Larry et al., "Access Rights Analysis for Java," Nov. 8, 2002. ACM, 14 pages. Retrieved from http://www.research.ibm.com/javasec/OOPSLA2002preprint.pdf.*

Tonti, Gianluca et al., "Automated Generation of Enforcement Machanisms for Semantically-Rich Security Policies in Java-based Multi-Agent Systems," 2004. IEEE, 10 pages. Retrieved from http://ieeexplore.ieee.org/iel5/9437/29953/01368413.pdf?tp=&arnumber=1368413 &isnumber=29953.*

Rustan, K., Leino, M., "Data Groups: Specifying the modification of extended state", Oct. 1998, ACM Press, pp. 144-153.*

* cited by examiner

Primary Examiner—Christopher Revak
Assistant Examiner—Kaveh Abrishamkar
(74) Attorney, Agent, or Firm—Dreier LLP

(57) ABSTRACT

A framework is provided for declaratively specifying authorization enforcement points and associating them with classes and subclasses by using declarations that map constants, local variables, or instance variables to permission classes and subclasses such as Java Permission, PermissionFactory, PrivilegedAction and PrivilegedActionFactory classes.

36 Claims, 6 Drawing Sheets

Target Class ProfileService

```
public Profile getProfile(String profileName, String attributes)
{
        System.out.println("\n*** ProfileService.getProfile entry ***");

//get attributes associated w/profileName from DB
}
```

Custom Authorization Deployment Descriptor

...
<authorizationTarget class="ProfileService">

<subjectFactory class="ThreadSubjectFactory"/>

<method name="getProfile">
        <requiredPermission class ="com.ibm.resource.security.auth.ProfilePermission">
            <property name="name" value="UserProfile" />
            <property name="actions" value="Read" />
            <property name="attributes" value="attributes" scope="local" />
        </requiredPermission>

<privilegedAction class ="ReadAction">
            <property name="attributes" value="attributes" scope="local" />
        </privilegedAction>

</method>

</authorizationTarget>
...

Target Class ProfileService — Instrumented Code

```
public Profile getProfile(String profileName, String attributes)
{
        System.out.println("\n*** ProfileService.getProfile entry ***");

/* JAVA LANGUAGE EQUIVALENT OF INSTRUMENTATION
(It's actually inserted into the target as byte code)
*/
SubjectFactory subjectFactory= new ThreadSubjectFactory();
Subject user =subjectFactory.getSubject();

if(user != null  &&  (System.getProperty("custom_authorization") != null))
{

PermissionFactory permissionFactory = (new DefaultPermissionFactory()).getFactory();

permissionFactory.setProperty("RequiredPermission","com.ibm.resource.security.auth.ProfilePermission");
permissionFactory.setProperty("RequiredPermission.name", "UserProfile");
permissionFactory.setProperty("RequiredPermission.actions", "read");
permissionFactory.setProperty("RequiredPermission.attributes", attributes);

PrivilegedActionFactory privilegedActionFactory =  (new DefaultPrivilegedActionFactory()).getFactory();
privilegedActionFactory.setProperty("PermissionFactory", permissionFactory);
privilegedActionFactory.setProperty("PrivilegedAction", "ReadAction");
privilegedActionFactory.setProperty("attributes", attributes);

Subject.doAsPrivileged(user, privilegedActionFactory.getPrivilegedAction(), null);

}
/*END INSTRUMENTATION */

//get attributes associated w/profileName from DB
}
```

Byte-code instrumentation could be achieved using BCEL

```
SubjectFactory subjectFactory= new ThreadSubjectFactory();
//  6   16:new         #6    <Class ThreadSubjectFactory>
```

6)CONSTANT_Class[7](name_index = 71)

71)CONSTANT_Utf8[1]("ThreadSubjectFactory")

bcel:
subjectFactoryClass_idx =
constPool.addClass("ThreadSubjectFactory");
InstructionList patchEnd = new InstructionList();
patchEnd.append(new NEW(subjectFactoryClass_idx));

```
//  7   19:dup
``` bcel:
patchEnd.append(new DUP());

```
//  8   20:invokespecial  #7   <Method void ThreadSubjectFactory()>
```

7)CONSTANT_Methodref[10](class_index = 6, name_and_type_index = 64)

6)CONSTANT_Class[7](name_index = 71)

71)CONSTANT_Utf8[1]("ThreadSubjectFactory")

64)CONSTANT_NameAndType[12](name_index = 42, signature_index = 43)

42)CONSTANT_Utf8[1]("<init>")
43)CONSTANT_Utf8[1]("()V")
(invoke special must pop the object reference of the stack...)

bcel:
subjectFactoryConstructor_idx =
constPool.addMethodref("ThreadSubjectFactory", "<init>", "()V");
patchEnd.append(new NEW
INVOKESPECIAL(subjectFactoryConstructor_idx));

METHOD AND SYSTEM FOR PROVIDING AN AUTHORIZATION FRAMEWORK FOR APPLICATIONS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

The invention disclosed herein relates generally to systems and methods for providing an authorization framework for applications. More particularly, the present invention provides for declaratively specifying authorization enforcement points and associating them with permission classes and subclasses by using declarations that map constants, local variables, or instance variables to permission classes and subclasses such as Java Permission, PermissionFactory, PrivilegedAction and PrivilegedActionFactory classes.

Providing security measures that allow granularity involves establishing a complex set of relationships between principals and permissions for authorizations to run or use certain processes in applications. A "principal" is an entity in the computer system to which permissions are granted, and is also called a "target application" herein, which contains classes of objects, or "target classes." Examples of principals include processes, objects and threads. A "permission" is an authorization by the computer system that allows a principal to perform a particular action or function. In many cases, the principals also involve user-oriented processes, such as a user interface providing authorized access to a database, wherein the permission to be granted is to allow the user interface access to the database so the user may have access.

There are several systems implemented for use with Java "permission" classes, such as the system described in U.S. Pat. No. 6,047,377 to Gong ("Gong"). Gong describes a method and apparatus for establishing and maintaining complex security rules. The security rules are established through the use of permission classes that have the ability to inherit attributes and methods. For example, a permission super class is established that defines an interface to a validation method. A permission subclass may then be created which provides an implementation of the validation method. When invoked, the validation method indicates whether a given permission represented by one object belonging to a permission class encompasses the permission represented by another object belonging to a permission class. Classes are also provided for grouping permissions into sets, and for establishing protection domains for classes of objects. However, using the system described in Gong, in order to introduce new permission subclasses, or to change permission subclasses, developers are still required to perform considerable programming, or re-programming, to change the references to those subclasses for each authorization enforcement point in a target application containing those references.

BRIEF SUMMARY OF THE INVENTION

The present invention addresses, among other things, the problems discussed above with respect to applications' granting of permissions to target applications, such as target classes, processes, objects and threads.

The present invention provides a system and method, or framework, for declaratively specifying authorization enforcement points and associating them with per-mission subclasses. Authorization enforcement code is inserted into one or more of the target classes of the target application according to the authorization enforcement points.

For example, some embodiments are for use in the Java Authentication and Authorization API (JAAS). In those embodiments, the invention provides for declarative specification of authorization enforcement points, which are associated with the java.security.Permission subclass (or a PermissionFactory), and/or a java.security.PrivilegedAction implementation (or a PrivilegedActionFactory). The system fully exposes the flexibility and extensibility of the JAAS framework by providing application deployers or developers the ability to introduce their own permission subclasses and/or PrivilegedAction implementations for evaluation at the authorization enforcement points in a non-programmatic manner.

In the present invention, for the Java/JAAS embodiment using a SubjectFactory, PermissionFactory, and a PriviliegedAction factory, a declaration specifies the PermissionFactory, and/or the PrivilegedActionFactory, capable of producing the appropriate permission and/or PrivilegedAction implementation, which may also be based on run-time conditions. The declaration also specifies a SubjectFactory capable of determining the javax.security.auth.Subject instance which will be associated with the access control context. Declarations may map constants, local variables, or instance variables to Java Permission, PermissionFactory, PrivilegedAction and PrivilegedActionFactory properties.

Authorization enforcement points are not limited to a "container" scope—any class may be instrumented with authorization enforcement code. It is not necessary to have source code for the target class.

BRIEF DESCRIPTION OF THE DRAWINGS

The invention is illustrated in the figures of the accompanying drawings which are meant to be exemplary and not limiting, in which like references are intended to refer to like or corresponding parts, and in which:

FIG. 2 illustrates a method for an example target class of FIG. 1;

FIG. 3 illustrates an example deployment descriptor for the target application of FIG. 1 is shown;

FIG. 5 is an example of the instrumented target class according to the example implementation of the invention of FIGS. 2 and 3; and FIG. 6 is the byte code representation of the instrumented target class code of FIG. 5, with exemplary byte code insertion implementation code shown at the enforcement points.

DETAILED DESCRIPTION OF THE PREFERRED EMBODIMENTS

Figure 1:
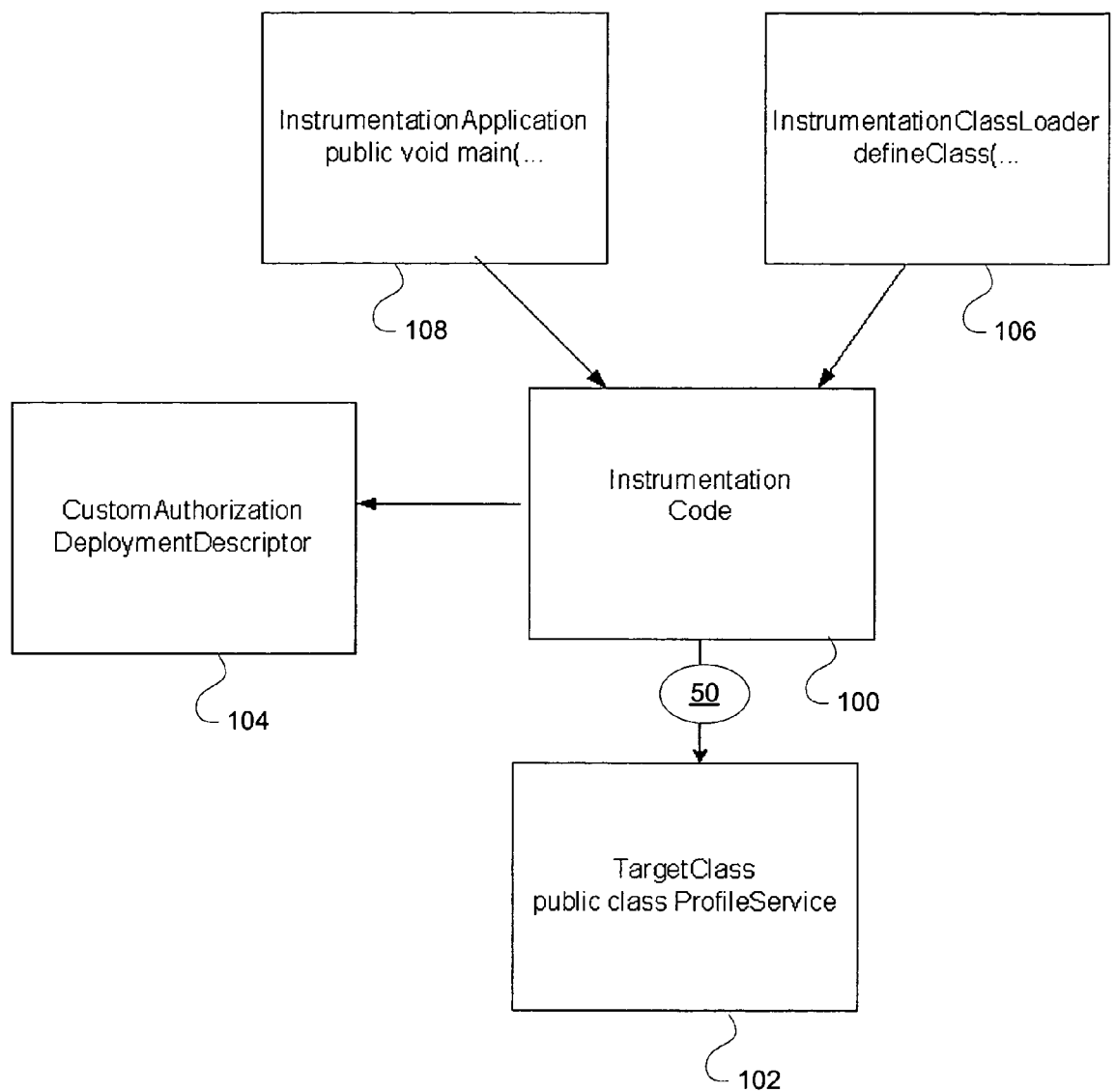
FIG. 1 is a block diagram illustrating the overall structure of some embodiments of the present invention implemented using the JAVA™ Authentication and Authorization Service API (JARS) is shown.

Preferred embodiments of the invention are now described with reference to the drawings. In accordance with the invention, and with reference to FIG. 1, a block diagram illustrates the overall structure of some embodiments implemented using the JAVA™ Authentication and Authorization Service API (JARS) The JARS provides flexible and scalable mechanisms for securing client-side and server-side JAVA™ applications. The JARS is pluggable and stackable, and lets developers incorporate standard security mechanisms like Solaris NIS, Windows NT, lightweight access directory protocol (LDAP), Kerberos, and others, into applications in a consistent, configurable way.

The system of the present invention directly instruments target class binaries at deployment time or at run time through a class loader based on deployment descriptor settings. Instrumentation of JAVA™ bytecode comprises inserting a short sequence of bytecode at designated points in the JAVA™ classes of an application. Such a technique is commonly used to facilitate runtime analysis of those classes, which involves mostly profiling, monitoring, or other introspection tasks. However, the present invention uses the technique to insert its instrumentation code (100 in FIG. 1).

There are two types of instrumentation, static and dynamic. Static instrumentation of code can occur during or after compilation, but dynamic instrumentation can take place at runtime, which includes after the target application is loaded in a memory for execution. Runtime class instrumentation is performed through a class preprocessor 50, whereby a class preprocessor 50 inserts instrumentation code 100 at the required places in the target JAVA™ classes 102 just before it is loaded by a JAVA™ virtual machine. The class preprocessor 50 works in conjunction with an instrumentation class loader 106.

The instrumentation code 100, which may be derived or compiled from an instrumentation application 108, contains references to a custom authorization deployment descriptor 104. The deployment descriptor 104 is a file that contains initialization parameters for the instrumentation code 100. Declarative specifications that map constants, local variables, or instance variables to Permission, PermissionFactory, PrivilegedAction, and PrivilegedActionFactory properties are stored in the deployment descriptor 104. The instrumentation code 100 initializes the variables, and calls the privilege action procedures that perform the authorizations. The constants in the deployment descriptor 102 may be easily defined or changed, even at runtime, after the instrumentation code 100 has been defined or compiled. Insertion of the instrumentation code 100 into the target class code 102 may occur as late as during deployment or at runtime of the target application 102, which may included after the application is loaded into a memory for execution, at which time the constants are read to determine the correct authorization point values to insert into the instrumentation code 100.

With reference to FIG. 2, the code for an example method 102a of target class 102 is shown. The class is named "ProfileService." In this simple illustration, the method 102a only has one line of code, which is to print the line "*ProfileService.getProfile entry*" on the screen while it is executing.

With reference to FIG. 3, example code 104a for a deployment descriptor 104 is shown. The target is defined in the first line as the "ProfileService" class of FIG. 2. In the second line of the descriptor, the subject factory class is called "ThreadSubjectFactory." On line 3, the descriptor starts for the method "getProfile" (which is the method shown in 102a of FIG. 2). The required permission class is named on line 4 as "com.ibm.resource.security.auth. ProfilePermission", and the various properties of the com.ibm.resource.security.auth.ProfilePermission permission class are defined in lines 5-7. A permission class is a class for representing access to a system resource, which is, in this case, the getProfile method of the ProifleService target class. The name of the class is typically a pathname of a file (or directory). Permission class objects typically include an "actions" list that lists the actions that are permitted for the object. The actions list (such as "read, write") specifies which actions are granted for the specified file (or for files in the specified directory). For example, one of the listed actions that may be authorized for the requiredPermission class object com.ibm.resource.security.auth. ProfilePermission is an action called "ReadAction," which is used to read the properties defined in lines 5-7 from a profile database indicated by the com.ibm.resource.security.auth. ProfilePermission class object. Lines 9-11 shows an example descriptor for the privileged action ReadAction along with the attributes for that action.

One method that is typically implemented in a permission class is an "implies" method to compare permissions. For example, "permission p1 implies permission p2" would mean that if a user is granted permission p1, the user is naturally granted permission p2. In the case of the class object com.ibm.resource.security.auth.ProfilePermission, if that object has a WriteAction permission, and permission is granted to the WriteAction action, the implies method may imply permission to the ReadAction permission.

Figure 4:
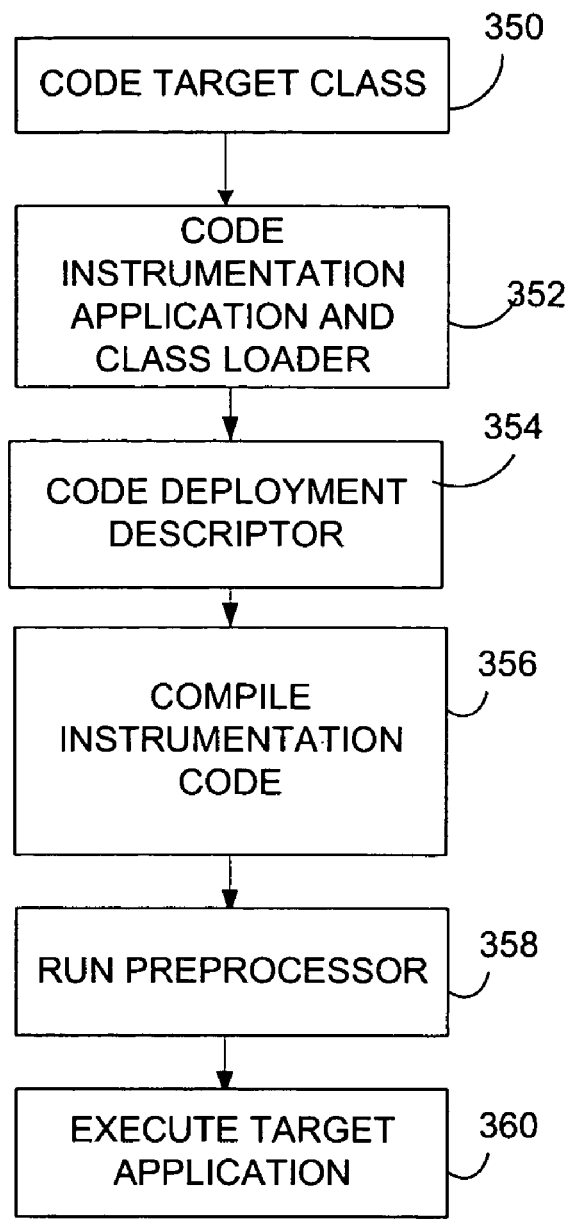
FIG. 4 is a flow diagram illustrating a method performed by the system represented in FIG. 1.

With reference to FIG. 4, a flow diagram is shown illustrating the steps performed by the system and method represented in FIG. 1. After a target class 102 is coded or identified, step 350, the instrumentation application is coded or changed for the target class 102, step 352. The deployment descriptor is coded, step 354. If necessary or preferred by the developer, the instrumentation code may then be compiled into the instrumentation code 100, step 356. Otherwise, the instrumentation code 100 may remain in scripted form depending on the type of system in which the invention is being implemented. At either runtime, or sometime before runtime, of the target application containing the target class 102, class instrumentation is performed using the class preprocessor 50, whereby a class preprocessor 50, in conjunction with the instrumentation class loader 106, inserts instrumentation code 100 at the required places in the target Java class 102 just before it is loaded by a Java virtual machine, step 358. The target application may then be executed, performing the instrumentation code 100 at the appropriate times during execution, step 360.

With reference to FIG. 5, an example of the instrumented code 102b class is shown according to the example implementation of the invention of FIGS. 2 and 3, which is the state of the method code 102a from FIG. 2 after instrumentation of instrumentation code 100 by the class preprocessor 50. As mentioned in the comment section on lines 4-5 of the code, although the authorization enforcement code in the example is actually inserted as byte code, for the purposes of illustration, the Java code version of the instrumented code 102b is shown in FIG. 5. As can be seen, in the instrumented part of code 102b, the preprocessor 50 has read the deployment descriptor code 104a, and added the appropriate instrumentation code 100 according to the parameters in the deployment descriptor code 104a. The instrumentation code added to the target class code 102a in this example 102b creates permissionFactory and privilgedActionFactory objects, sets the properties needed to read the profile database by running the a setPropery method of those objects, and executes a getPrivilegeAction method which executes the ReadAction privilege action of the instrumentation code 100.

With reference to FIG. 6, the byte code representation of the instrumented target class code 102b of FIG. 5 is shown. In addition to the instrumented byte code, the byte code insertion implementation code 600 is shown. In this embodiment, the code may be created by the system according to the code 104a of the deployment descriptor 104. The example code shown is compliant with the publicly available byte code engineering laboratory format. However, those skilled in the art would recognize that the byte insertion code may be implemented using a variety languages and formats, including C, C++, or assembly languages.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A system for providing an authorization framework for an application, comprising:
   one or more declarations for specifying authorization enforcement points for one or more target classes in an application;
   one or more declarations selected from a group consisting of a constant, a local variable and an instance variable for specifying one or more permission classes for the one or more authorization enforcement points;
   authorization enforcement code derived from the one or more declarations for specifying one or more permission classes for the one or more authorization enforcement points; and
   a processor programmed to insert authorization enforcement code into one or more of the target classes according to the authorization enforcement points.

2. The system of claim 1, wherein the authorization enforcement points correspond to one or more methods of the one or more target classes.

3. The system of claim 1, wherein the authorization enforcement code is in the form of byte code.

4. The system of claim 1, wherein the authorization enforcement code is in the form of script code.

5. The system of claim 1, wherein the processor is programmed to insert the authorization enforcement code in the one or more target classes at runtime of the application.

6. The system of claim 1, wherein the processor is programmed to insert the authorization enforcement code in the one or more target classes after the application is loaded in a memory for execution.

7. The system of claim 1, wherein the application comprises a set of Java-based executable program.

8. The system of claim 1, wherein each of the declarations are stored in a deployment descriptor.

9. The system of claim 1, wherein at least one of the declarations specifies a subject factory.

10. The system of claim 1, wherein at least one of the permission classes is a permission factory.

11. The system of claim 1, wherein at least one of the permission classes is a privileged action factory.

12. The system of claim 1, wherein at least one of the permission classes is a permission action factory.

13. A method for providing an authorization framework for an application, comprising:
    coding one or more declarations for specifying authorization enforcement points for one or more target classes in an application;
    coding one or more declarations selected from a group consisting of a constant, a local variable and an instance variable for specifying one or more permission classes for the one or more authorization enforcement points;
    compiling authorization enforcement code derived from the one or more declarations for specifying one or more permission classes for the one or more authorization enforcement points; and
    inserting authorization enforcement code into one or more of the target classes according to the authorization enforcement points.

14. The method of claim 13, wherein the authorization enforcement points correspond to one or more methods of the one or more target classes.

15. The method of claim 13, wherein the authorization enforcement code is in the form of byte code.

16. The method of claim 13, wherein the authorization enforcement code is in the form of script code.

17. The method of claim 13, wherein the step of inserting occurs at runtime of the application.

18. The method of claim 13, wherein the step of inserting occurs after the application is loaded in a memory for execution.

19. The method of claim 13, wherein the application comprises a Java-based executable program.

20. The method of claim 13, wherein each of the declarations are stored in a deployment descriptor.

21. The method of claim 13, wherein at least one of the declarations specifies a subject factory.

22. The method of claim 13, wherein at least one of the permission classes is permission factory.

23. The method of claim 13, wherein at least one of the permission classes is a privileged action factory.

24. The method of claim 13, wherein at least one of the permission classes is a permission action factory.

25. A computer program product having a computer readable medium having computer program logic recorded thereon for providing an authorization framework for an application, comprising:
    one or more declarations for specifying authorization enforcement points for one or more target classes in an application;
    one or more declarations selected from a group consisting of a constant, a local variable and an instance variable for specifying one or more permission classes for the one or more authorization enforcement points;
    authorization enforcement code derived from the one or more declarations for specifying one or more permission classes for the one or more authorization enforcement points; and
    computer readable means for inserting authorization enforcement code into one or more of the target classes according to the authorization enforcement points.

26. The computer program of claim 25, wherein the authorization enforcement points correspond to one or more methods of the one or more target classes.

27. The computer program of claim 25, wherein the permission class objects are in the form of byte code.

28. The computer program of claim 25, wherein the authorization enforcement code is in the form of script code.

29. The computer program of claim 25, wherein the computer readable means for inserting are for inserting the authorization enforcement code at runtime of the application.

30. The computer program of claim 25, wherein the computer readable means for inserting are for inserting the authorization enforcement code after the application is loaded in a memory for execution.

31. The computer program of claim 25, wherein the application comprises a Java-based executable program.

32. The computer program of claim 25, wherein each of the declarations are stored in a deployment descriptor.

33. The computer program of claim 25, wherein at least one of the declarations specifies a subject factory.

34. The computer program of claim 25, wherein at least one of the permission classes is a permission factory.

35. The computer program of claim 25, wherein at least one of the permission classes is a privileged action factory.

36. The computer program of claim 25, wherein at least one of the permission classes is a permission action factory.

* * * * *